B. R., C., AND R. S. BOLENBAUGH AND L. W. LONG.
WHEEL CONSTRUCTION.
APPLICATION FILED OCT. 2, 1920.
1,406,920.
Patented Feb. 14, 1922.
5 SHEETS—SHEET 1.
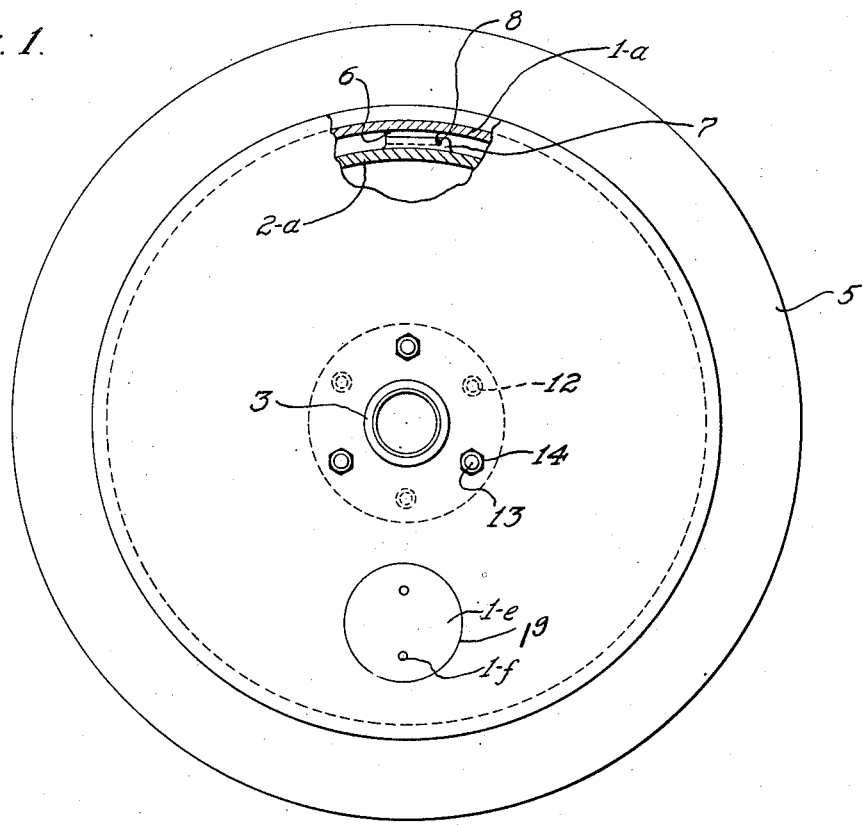
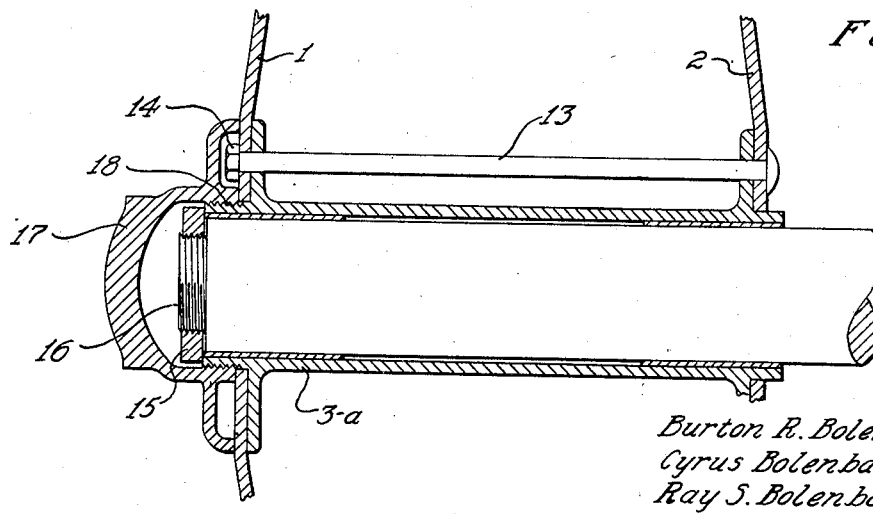
Burton R. Bolenbaugh.
Cyrus Bolenbaugh.
Ray S. Bolenbaugh.
Laurence W. Long.
INVENTOR
BY Victor J. Evans
ATTORNEY

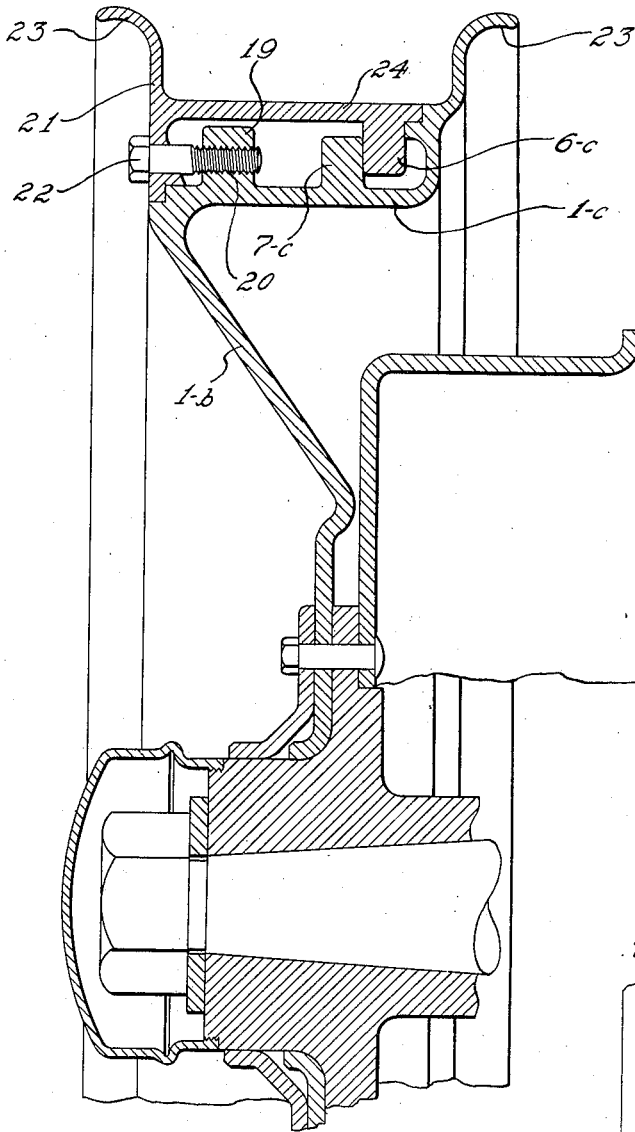
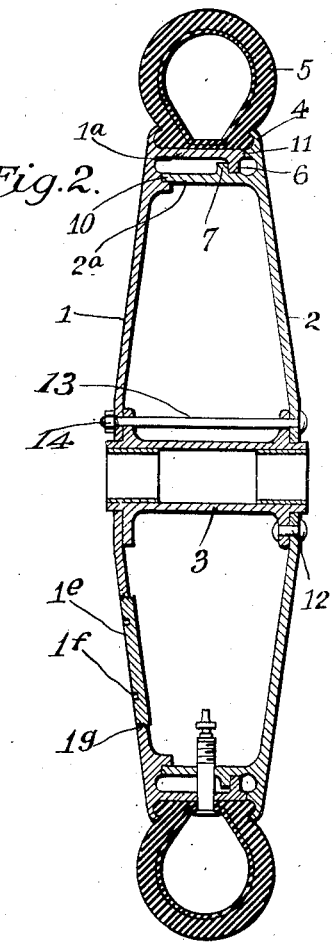
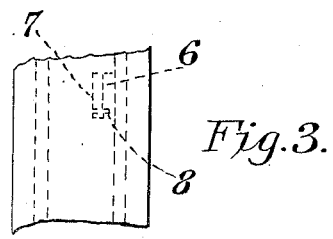

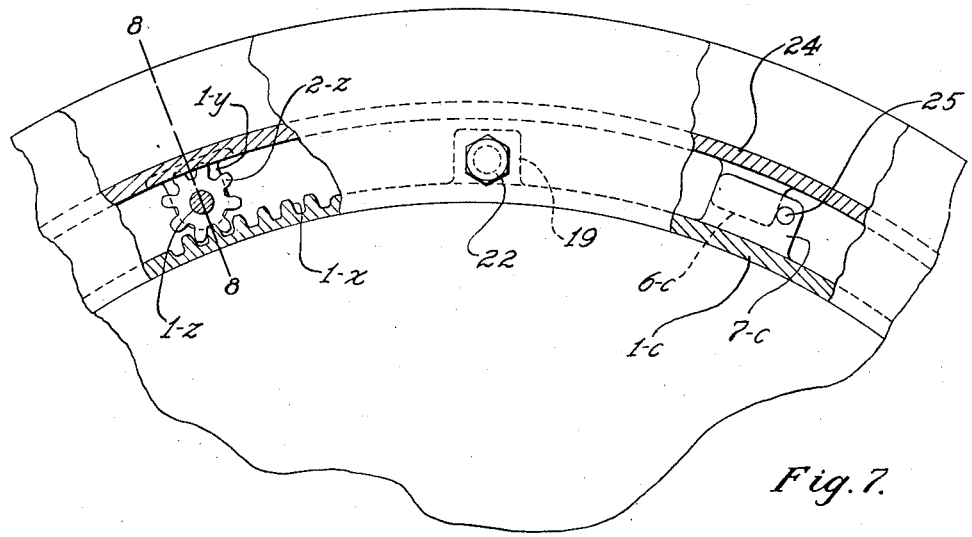
Fig. 7.
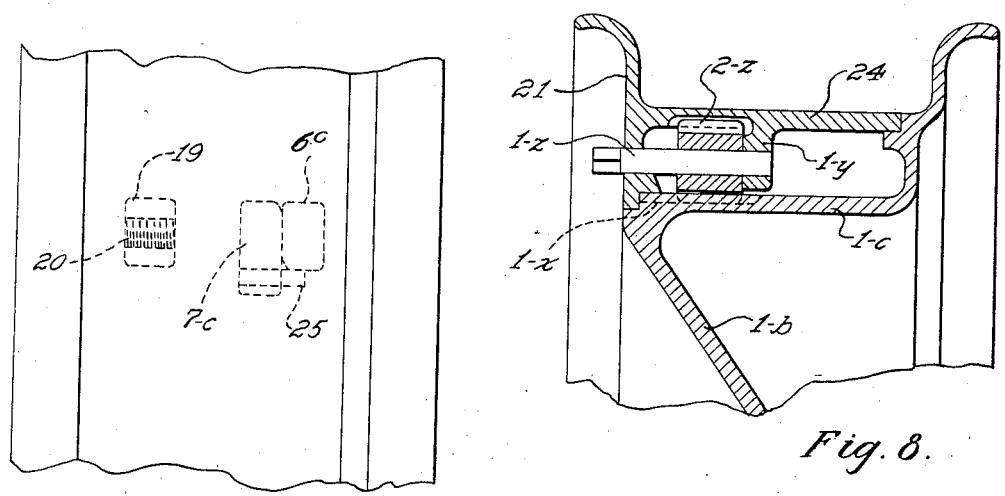
Fig. 6.
Fig. 8.

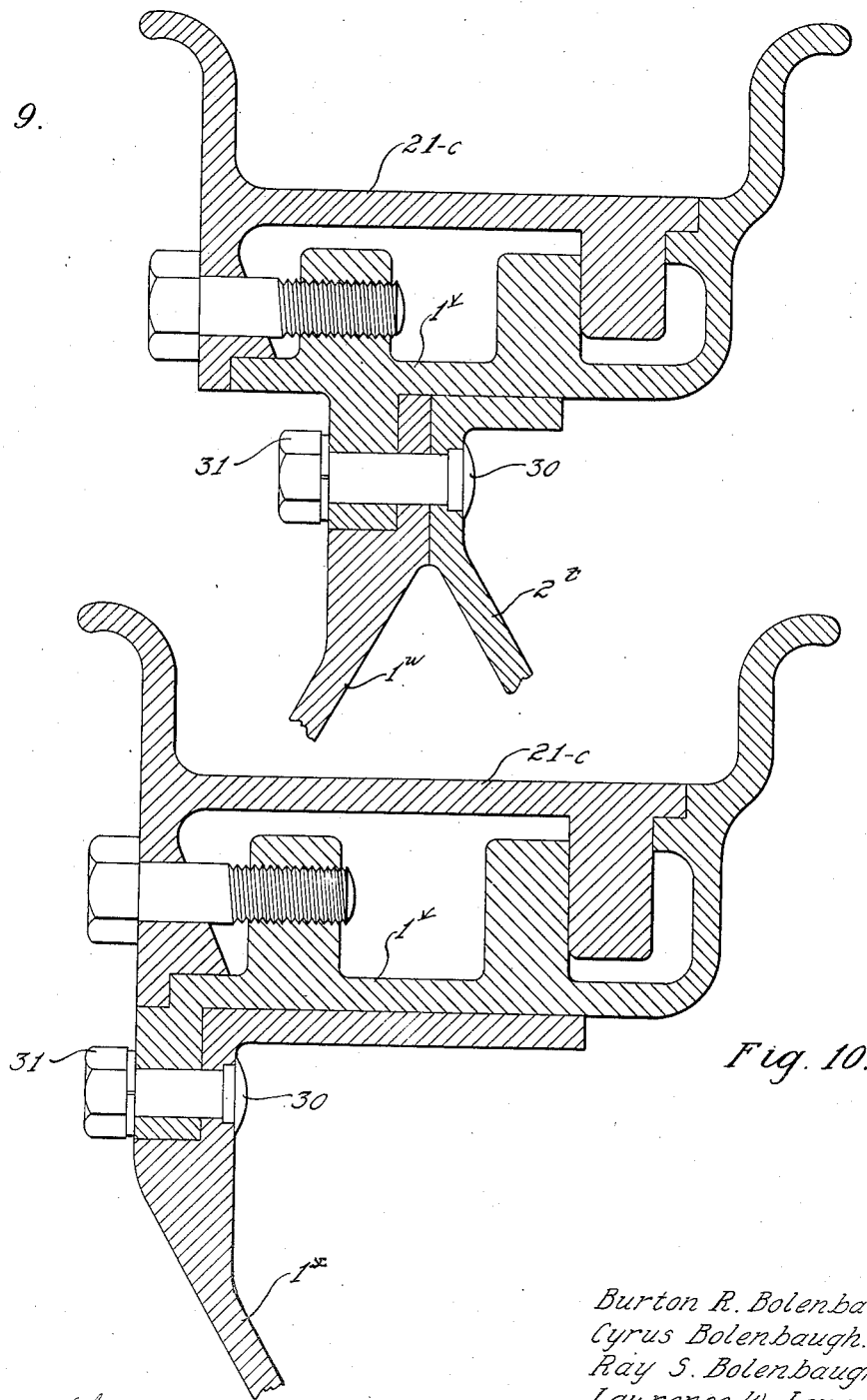

B. R., C., AND R. S. BOLENBAUGH AND L. W. LONG.
WHEEL CONSTRUCTION.
APPLICATION FILED OCT. 2, 1920.

1,406,920.

Patented Feb. 14, 1922.

Burton R. Bolenbaugh
Cyrus Bolenbaugh
Ray S. Bolenbaugh
Laurence W. Long
INVENTOR BY *Victor J. Evans*
ATTORNEY

WITNESSES

UNITED STATES PATENT OFFICE.

BURTON ROY BOLENBAUGH, CYRUS BOLENBAUGH, RAY SANFORD BOLENBAUGH, AND LAURENCE W. LONG, OF JACKSON, MICHIGAN, ASSIGNORS OF ONE-THIRD TO SAID BURTON ROY BOLENBAUGH, CYRUS BOLENBAUGH, AND RAY SANFORD BOLENBAUGH; ONE-SIXTH TO SAID LONG; ONE-SIXTH TO ARTHUR PAULSON, OF NEW YORK, N. Y.; ONE-SIXTH TO HUGH E. KEELER, OF ANN ARBOR, MICHIGAN, AND ONE-SIXTH TO LEWIS H. FLYNN, OF ALBANY, NEW YORK.

WHEEL CONSTRUCTION.

1,406,920. Specification of Letters Patent. Patented Feb. 14, 1922.

Application filed October 2, 1920. Serial No. 414,200.

*To all whom it may concern:*

Be it known that we, BURTON ROY BOLENBAUGH, CYRUS BOLENBAUGH, RAY SANFORD BOLENBAUGH, and LAURENCE W. LONG, citizens of the United States, residing at Jackson, in the county of Jackson and State of Michigan, have invented new and useful Improvements in Wheel Constructions, of which the following is a specification.

The object of our present joint invention is the provision of a wheel that is a practical improvement over those extant in respect to utility, durability and facility of manipulation.

To the attainment of the foregoing the invention consists in the improvement as hereinafter described and definitely claimed.

In the accompanying drawings, hereby made a part hereof:—

Figure 1 is a side elevation, partly in section, of one type of wheel constructed in accordance with our invention.

Figure 2 is a diametrical section of the same.

Figure 3 is a fragmentary detail of a portion of the wheel.

Figure 4 is a detail view of a modified construction.

Figures 5, 6 and 7 are views of another type of wheel embodying our invention.

Figure 8 is a transverse section taken in the plane indicated by the line 8—8 of Figure 7.

Figures 9 and 10 are fragmentary diametrical sections of modifications hereinafter explicitly referred to.

Figures 11 to 15 are views of modifications hereinafter explicitly referred to.

Figures 16 to 18 are views of another modification hereinafter explicitly referred to.

Similar numerals designate corresponding parts in Figures 1 to 3 to which reference will first be made.

Figure 11:
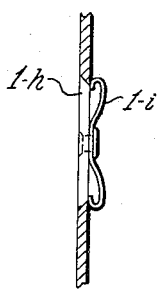
Figure 13:
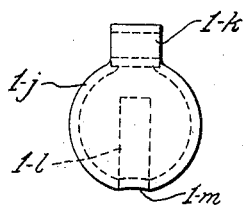
Figure 12:
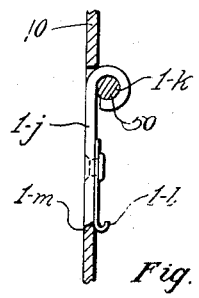

By comparison of Figures 1 to 3 it will be observed that the wheel includes three major sections that are cast of an appropriate metal or alloy. The said sections are the two disks 1 and 2 and a hub 3. The disks 1 and 2 are equipped at 4 for the retention of a tire 5, and the said disks 1 and 2 are characterized by lugs 6 and 7, respectively, and one of the disks is also provided with a stop pin 8 having a limited movement in the other disk. In forming the wheel the two disks 1 and 2 are placed in opposed or superimposed relation and one of them is turned slightly through a part of a circle so that the locking lugs of one are positioned directly behind the locking lugs of the other. The effect of this is to hold the disks together—i. e., against transverse separation, and so long as the disks 1 and 2 are held together it will be observed that the tire 5 will be securely held to the disks. The lugs 6 of the disk 1 are carried by a lateral flange $1^a$ of the said disk, and the lugs 7 of the disk 2 are carried by a lateral flange $2^a$ on the disk 2, and the stop pin 8 is carried on one of the said flanges to work within the other flange. The flanges $1^a$ and $2^a$ are arranged in spaced relation owing to the fact that the flange $2^a$ is of less diameter than the flange $1^a$, and the edge of the flange of each disk bears solidly against the other disk as indicated by 10 and 11 with the result that each disk tends to press against and lend increased stiffness and strength to the other disk. The rear or back disk 2 is held to the hub 3 by means of rivets 12, and the other or front disk 1 may be held to the hub by any appropriate means. For instance in Figures 1 and 2 the disk 1 is held to the hub 3 through the medium of bolts 13 and nuts 14. When deemed expedient, however, the bolts 13 and the nuts 14 may be dispensed with, and the disks 1 and 2 may be held against turning and unlocking through the medium of the means shown in Figure 4, which means includes a hexagonal nut 15 threaded on an axle spindle 16, and a hub cap 17 of bronze or other appropriate metal threaded at 18 on the end of the hub $3^a$ and enclosing the hexagonal nut. Or if preferred the said means may be employed in association with bolts 13 and nuts 14 as illustrated in Figure 4.

In the embodiment shown in Figures 5, 6, 7 and 8 the single disk $1^b$ is provided with the flange $1^c$ on which are lugs $7^c$ as well as lugs 19, having transversely disposed threaded bores 20. In association with the disk $1^b$ characterized as stated we employ a detachable rim section 21 that is connected to the disk $1^b$ through the medium of bolts 22 engaged with the lugs 19 as illustrated. The rim section 21 is provided with lugs $6^c$ adapted when either the disk $1^b$ or the rim section 21 is turned relatively to the other to be positioned back of the lugs $7^c$ as illustrated so as to hold the disk $1^b$ and the rim section 21 against transverse disassociation. It will also be understood in this connection that the disk $1^b$ and the rim section 21 are flanged as indicated by 23 to enable them to hold a tire which will seat against the flange 24 of the detachable rim section 21; and it will also be understood that one of the said elements (disk $1^b$ or rim section 21) will be provided with a stop pin 25 to bring up against a lug $6^c$ or $7^c$ of the other, Figures 6 and 7, with a view to limiting the turning movement of one of the said elements relatively to the other. We prefer to employ three of the bolts 22 and to arrange the same equi-distantly.

In order to enable a single hand to turn the rim section 21 about the disk $1^h$ we provide on the disk $1^u$ a rack $1^x$, and we equip the rim section 21 with a lug $1^y$ in which is journaled a spindle $1^z$ having fixed thereto a spur gear $2^z$. The intermeshed teeth are preferably tapered as shown to facilitate ease of operation, and the outer end of the spindle $1^z$ is made angular in cross section for the application of a wrench or other turning implement, and it will be readily understood that when the spur gear $2^z$ is turned about its axis the rim section 21 will be moved through a part of a revolution about the disk $1^b$ so that the rim section 21 may be easily disassociated from the disk $1^b$ for the removal of a tire from the wheel. Manifestly this provision is designed especially for heavy wheels such as truck wheels.

In Figure 9 we illustrate a modification of double disk type, the two disks $1^u$ and $2^t$ being associated with demountable rim sections $1^v$ and $21^c$. The disks $1^u$ and $2^t$ and the rim section $1^v$ are connected together by bolts 30 and nuts 31 thereon, and the rim section $21^c$ is engaged and connected with the rim section $1^v$ in the manner before described.

In the modification shown in Figure 10 the rim section $1^h$ is connected with a single disk $1^x$ through the medium of bolts 30 and nuts 31, and engaged and connected with the rim section $1^h$ in the manner before described is a rim section $21^c$.

Reverting to Figures 1 and 2 it will be observed that one of the disks 1 and 2 is provided with a valve opening—i. e., an opening to afford access to the valve through which the tire is inflated. The wall of the said opening is threaded, and in order to normally close the same we provide the plug disk $1^e$; the said disk being peripherally threaded and being provided with sockets $1^f$ whereby it may be readily turned into and out of the threaded opening which is indicated by $1^g$. When in position the plug disk $1^e$ rests flush with the outer side of the disk and does not detract in any measure from the finished appearance of the wheel.

We do not desire to be understood as confining ourselves to the specific manner just described of closing the valve opening. This will be better understood when it is stated that in Figures 11 to 15 are shown modified means for closing the opening.

The means shown in Figure 11 includes a beveled disk $1^h$, and a diametrical spring $1^i$ on said disk, the ends of the said spring $1^i$ being adapted to engage the wheel disk and to hold the plug disk in working position until a prying instrument is operated against the edge of the plug disk to displace the same. In the modification shown in Figures 12 and 13 the plug disk $1^j$ is hinged at $1^k$ to the wheel disk and is equipped with a stiff spring $1^l$. This stiff spring is riveted to the closure or plug disk in such manner as to hold the plug disk to the wheel disk when the former is closed. A slight groove $1^m$ is formed in the disk $1^j$ at a point opposite the hinge connection for the insertion of an implement with which to remove the plug disk. The hinge referred to is preferably formed by a pintle 50 on the wheel disk $1^o$ and a barrel on the closure disk $1^j$ and in which barrel the pintle is disposed, Figure 12.

Figure 15:
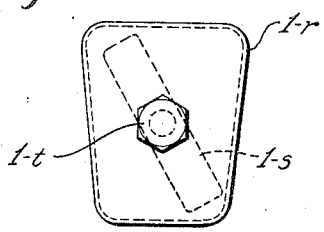
Figure 14:
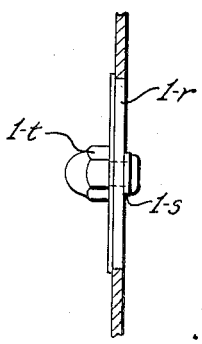

In Figures 14 and 15 the plug disk is numbered $1^r$ and is shown as provided with a spring strip $1^s$, riveted to a finger piece $1^t$ that rests outside the plate so that by turning said finger piece the spring strip $1^s$ will be positioned, see dotted lines in Figure 15, to lock or release the disk from the wheel disk.

Figure 16:
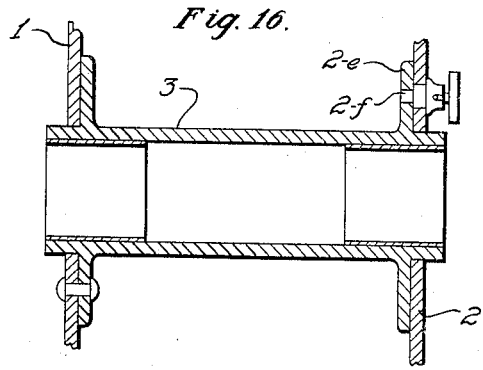
Figure 17:
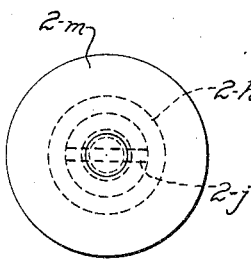
Figure 18:
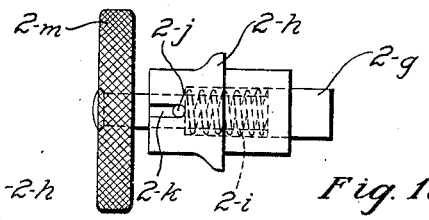

In Figures 16, 17 and 18 we show a desirable modified means to hold the disks 1 and 2 such as shown in Figures 1 and 2 against turning on the hub 3; the said hub being flanged. By particular reference to Figure 16 it will be observed that the hub flange $2^e$ is provided with a transverse socket $2^f$, and that one of the wheel disks, preferably the disk 2 carries what may be properly designated a stop pawl; the said stop pawl including a plunger $2^g$, a casing $2^h$, a spring $2^i$ and a lug $2^j$. The lug $2^j$ is designed to be seated in a socket $2^k$ in the casing. Thus in order to separate the wheel disks precedent to changing tires the plunger is first withdrawn from its socket in the hub flange. This may be conveniently accomplished by pulling on the knurled handle $2^m$, after which the plunger is turned about its axis. When the plunger is so turned the lug will be out of alinement with the socket therefor, and hence the plunger will be retained out of engagement with the hub flange. To assemble the wheel the operation described is reversed, the knurled handle being turned so that the lug moves inwardly into its socket, thereby allowing the plunger to enter its socket in the hub flange so as to strongly lock the wheel disk against any movement with respect to the hub.

Having described our invention, what we claim and desire to secure by Letters-Patent is:—

1. In a wheel construction, ring sections movable transversely together and apart and having lugs with cooperating faces extending throughout their lengths circumferentially of the sections and relatively arranged whereby when one section is turned with respect to the other the lugs of one section will be moved circumferentially behind the lugs of the other and the sections will be locked against disassociation, the said lugs being carried by inner and outer radially spaced annular flanges extending laterally inward from the rim sections and located nearer one rim section than the other, and the flange of each rim section being arranged to abut at its edge against the other rim section, and means detachably securing the sections together to prevent turning of one with respect to the other.

2. In a wheel construction, rim sections movable transversely toward and away from each other and having lugs with cooperating faces extending throughout their lengths circumferentially of the sections and relatively arranged whereby when one section is turned with respect to the other the lugs of one section will be moved circumferentially behind the lugs of the other and the sections will be locked against disassociation, the said lugs being carried by inner and outer radially spaced flanges extending laterally inward from the rim sections and being disposed nearer to one rim section than the other, and the flange of each rim section being arranged to abut at its edge against the other rim section, and the inner flange being provided at a point near the section carrying the outer flange with a radial lug in which is a transverse threaded aperture, and a headed screw extended through the last-named rim section and detachably connected to said lug.

3. In a wheel construction, rim sections movable transversely toward and away from each other and having lugs with cooperating faces extending throughout their lengths circumferentially of the sections and relatively arranged whereby when one section is turned with respect to the other the lugs of one section will be moved circumferentially behind the lugs of the other and the sections will be locked against disassociation, the said lugs being carried by inner and outer radially spaced annular flanges extending laterally inward from the rim sections and disposed nearer to one rim section than the other, and the flange of each rim section being arranged to abut at its edge against the other rim section, and the inner flange being provided at a point near the section carrying the outer flange with a radial lug in which is a transverse threaded aperture, a headed screw extended through the last-named section and detachably connected to said lug, an inwardly extended lug on the outer flange, a rack on the inner flange near the last-named rim section, a transverse shaft journaled in the last-named lug and in the last-named rim section, and a pinion fixed with respect to said shaft and intermeshed with said rack.

In testimony whereof we affix our signatures.

BURTON ROY BOLENBAUGH.
CYRUS BOLENBAUGH.
RAY SANFORD BOLENBAUGH.
LAURENCE W. LONG.